United States Patent
Gu et al.

(10) Patent No.: US 9,056,269 B2
(45) Date of Patent: Jun. 16, 2015

(54) HOT DETACHABLE AND REPLACEABLE WATER FILTER ASSEMBLY

(75) Inventors: Chengtao Gu, Ningbo (CN); Shugang Cai, Ningbo (CN); Xiaoming Hu, Ningbo (CN)

(73) Assignee: Ningbo Hidrotek Co., Ltd., Ningbo (CN)

( * ) Notice: Subject to any disclaimer, the term of this patent is extended or adjusted under 35 U.S.C. 154(b) by 0 days.

(21) Appl. No.: 13/822,104

(22) PCT Filed: Mar. 19, 2012

(86) PCT No.: PCT/CN2012/072546
§ 371 (c)(1),
(2), (4) Date: Mar. 11, 2013

(87) PCT Pub. No.: WO2013/123685
PCT Pub. Date: Aug. 29, 2013

(65) Prior Publication Data
US 2013/0220910 A1      Aug. 29, 2013

(30) Foreign Application Priority Data
Feb. 24, 2012 (CN) .......................... 2012 1 0043179

(51) Int. Cl.
*B01D 35/30* (2006.01)

(52) U.S. Cl.
CPC .......... *B01D 35/30* (2013.01); *B01D 2201/302* (2013.01); *B01D 2201/4015* (2013.01)

(58) Field of Classification Search
CPC .................. B01D 2201/291; B01D 2201/293; B01D 2201/302; B01D 2201/304; B01D 2201/305; B01D 2201/4007; B01D 2201/4015; B01D 2201/4023; B01D 2201/4076; B01D 2201/4084; B01D 35/30; B01D 35/303; B01D 35/306; C02F 2201/004; C02F 2201/006; C02F 2201/007

USPC .......................................... 210/235, 444, 437
See application file for complete search history.

(56) References Cited

U.S. PATENT DOCUMENTS

| 4,806,240 | A | * | 2/1989 | Giordano et al. | ............. 210/232 |
| 6,117,332 | A | * | 9/2000 | Hatch et al. | .................... 210/697 |

(Continued)

FOREIGN PATENT DOCUMENTS

| CN | 201135811 Y | 10/2008 | | |
| CN | 201482290 U | 5/2010 | | |
| CN | 201482290 U | * 5/2010 | ............. B01D 39/33 |
| CN | 201861442 U | 6/2011 | | |

OTHER PUBLICATIONS

DuPont, Whole House Filtration Installation Instructions, 2008, 20 pages.*

(Continued)

*Primary Examiner* — Lore Jarrett
*Assistant Examiner* — Patrick Orme
(74) *Attorney, Agent, or Firm* — The Webb Law Firm

(57) ABSTRACT

Disclosed is a hot detachable and replaceable water filter assembly, including a filter core cover and a filter cartridge; wherein the filter cover and the filter cartridge are fastened together. The filter cover includes an upper ceramic piece, a lower ceramic piece and a rotating shaft. The contact surface between the upper ceramic piece and lower ceramic piece is smooth. The upper ceramic piece includes a first through hole. The lower ceramic piece includes a corresponding second through hole. The lower ceramic piece includes a first groove. The rotating shaft includes a first projection to drive the lower ceramic piece to rotate. The filter cartridge includes a water division end cap which is cooperated with the rotating shaft.

8 Claims, 16 Drawing Sheets

(56) References Cited

U.S. PATENT DOCUMENTS

| | | | | |
|---|---|---|---|---|
| 7,048,129 | B2* | 5/2006 | Skillings | 210/424 |
| 7,442,301 | B2* | 10/2008 | Huda | 210/232 |
| 2003/0141235 | A1* | 7/2003 | Stankowski et al. | 210/232 |
| 2006/0261000 | A1* | 11/2006 | Bassett et al. | 210/435 |

OTHER PUBLICATIONS

Meng, CN201482290U, EPO English Machine Translation, 2013.*
Meng, CN201482290CNU, USPTO human English Translation, 2014, 20 pages.*

* cited by examiner

HOT DETACHABLE AND REPLACEABLE WATER FILTER ASSEMBLY

FIELD OF PATENT APPLICATION

The patent application relates to a water treatment field, and specifically relates to a detachable and replaceable water filter assembly.

BACKGROUND

A water filter should facilitate removal and ensure a good sealing in the installation, maintenance and replacement. The performance of water sealing is an important evaluation standard for the water filter.

The conventional water filter usually uses an elastic device to control the opening and closing of the water, such as a filter with a multi-branch pipe component. The multi-branch pipe component has an inlet in connection with a water supply, a filtered outlet and a multi-branch pipe installation device. The multi-branch pipe component inlet includes a first sealing device which separates an unfiltered water input flow and a filter core, and a second sealing device which separates the filtered water output flow and the filter core. The above technical solution adopts at least two seal devices and a plurality of branch components to realize seal and by-pass flow. Two sealing devices result in a relatively complicated manufacturing and installation process. Once any one of the two sealing devices has a problem, the seal effect cannot be realized. In addition, it needs to control the pressure of the elastic device. High operation requirements are needed to ensure that the elastic device does not go beyond its elastic range.

SUMMARY

The present patent application provides a detachable and replaceable water filter assembly to overcome the defects of complicated structure and installation inconvenience of the conventional water filter assembly.

To achieve the above object, the present patent application provides a detachable and replaceable water filter assembly. The detachable and replaceable water filter assembly includes a filter core cover (1) and a filter cartridge (2). The filter cover (1) and the filter cartridge (2) are fastened together.

The filter cover (1) comprises a holder (3), a nut cap (4), an upper ceramic piece (5), a lower ceramic piece (6) and a rotating shaft (7). The nut cap (4), the upper ceramic piece (5), the lower ceramic piece (6) and the rotating shaft (7) are connected. The nut cap (4) is mounted inside the holder (3). The upper ceramic piece (5) comprises a first through hole (55). The lower ceramic piece (6) comprises a corresponding second through hole (56). The lower ceramic piece (6) comprises a first groove (61). The rotating shaft (7) comprises a first projection (71) for cooperation with the first groove (61) and is used to drive the lower ceramic piece (6) to rotate. The rotating shaft (7) further comprises a third through hole (76) for cooperation with the second through hole (56).

The filter cartridge (2) comprises a snap button (9), a water division end cap (10) and a barrel (11). The snap button (9) and the water division end cap (10) can be rotated to fasten together. The barrel (11) has a filter core (20) inside. The water division end cap (10) is mounted at one end of the filter cartridge (2), and adhered to the filter core (20). The water division end cap (10) is cooperated with the rotating shaft (7). The snap button (9) covers the barrel (11) tightly.

The water division end cap (10) includes a water inlet channel (101) and a water outlet channel (102) for cooperating with a water inlet (301) and a water outlet (302) of the holder (3) respectively. The water inlet channel (101) and the water outlet channel (102) are independent and disconnected.

The upper ceramic piece (5) comprises an aperture (58) in connection with the water outlet (302).

When the water filter assembly is in an inoperative state, the water inlet channel (101) is disconnected with the water inlet (301), the water outlet channel (102) is disconnected with the water outlet (302), and the first through hole (55) is disconnected with the second through hole (56).

When the water filter assembly is in an operative state, the water inlet channel (101) is connected with the water inlet (301). The water outlet channel (102) is connected with the water outlet (302), and the first through hole (55) is connected with the second through hole (56).

In one embodiment of the present patent application, the rotating shaft (7) comprises a limiting block (75) for cooperating with a limiting groove (35) of the holder (3) for restricting the relative rotation angle between the upper ceramic piece (5) and the lower ceramic piece (6) to be less than or equal to 90 degrees.

In another embodiment of the present patent application, the nut cap (4) comprises a notch (43), the upper ceramic piece (5) comprises a projection (53) for cooperating with the notch (43).

In another embodiment of the present patent application, the snap button (9) comprises a flat open bayonet (91), the holder comprises a flat open groove (32) in cooperation with the flat open bayonet (91).

In another embodiment of the present patent application, the snap button (9) and the holder (3) snap together by rotating 90 degrees.

In another embodiment of the present patent application, the water division end cap (10) has wave form stripes on the side thereof being in contact with the filter core (20).

In another embodiment of the present patent application, wherein two O-type sealing rings (36) are set on the top of the water division end cap and set between the holder (3) and the upper ceramic piece (5) respectively.

In another embodiment of the present patent application, further comprises a pressure ring (37) being set between the nut cap (4) and the O-type sealing ring (36).

In another embodiment of the present patent application, further comprises a washer (39) being set between the lower ceramic piece (6) and rotating shaft (7).

Compared to the conventional technologies, the solutions provided by the present patent application have the following advantages. The structure is very simple without multi-branch pipe components and elastic device. It's easy to be dismantled and assembled. The detachable and replaceable water filter assembly is shockproof and able to prevent excessive rotation. The water inlet channel and the water outlet channel are independent. This design can prevent secondary pollution.

DETAILED DESCRIPTION

Reference will now be made in detail to a preferred embodiment of the detachable and replaceable water filter assembly disclosed in the present patent application, examples of which are also provided in the following description.

Figure 1:
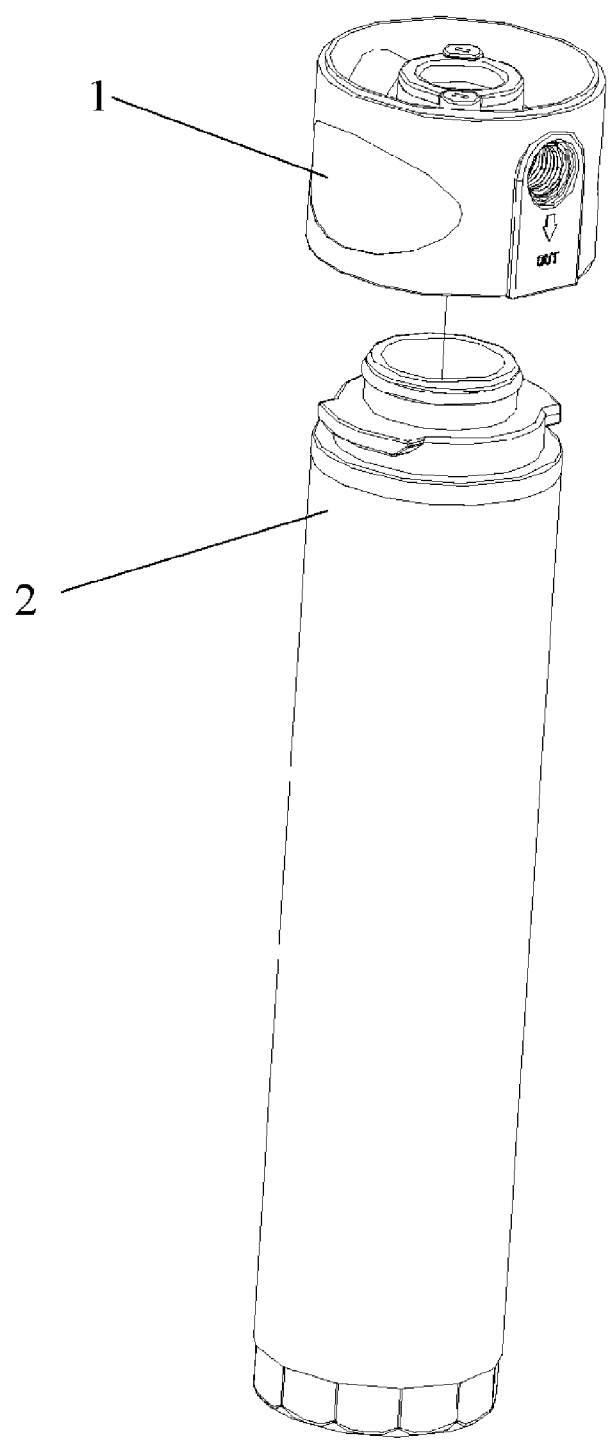
FIG. 1 is a schematic perspective view of a detachable and replaceable water filter assembly of the present patent application.

As shown in FIG. 1, a water filter assembly includes a filter core cover 1 and a filter cartridge 2. The filter core cover 1 and filter cartridge 2 are fastened together.

Figure 2:
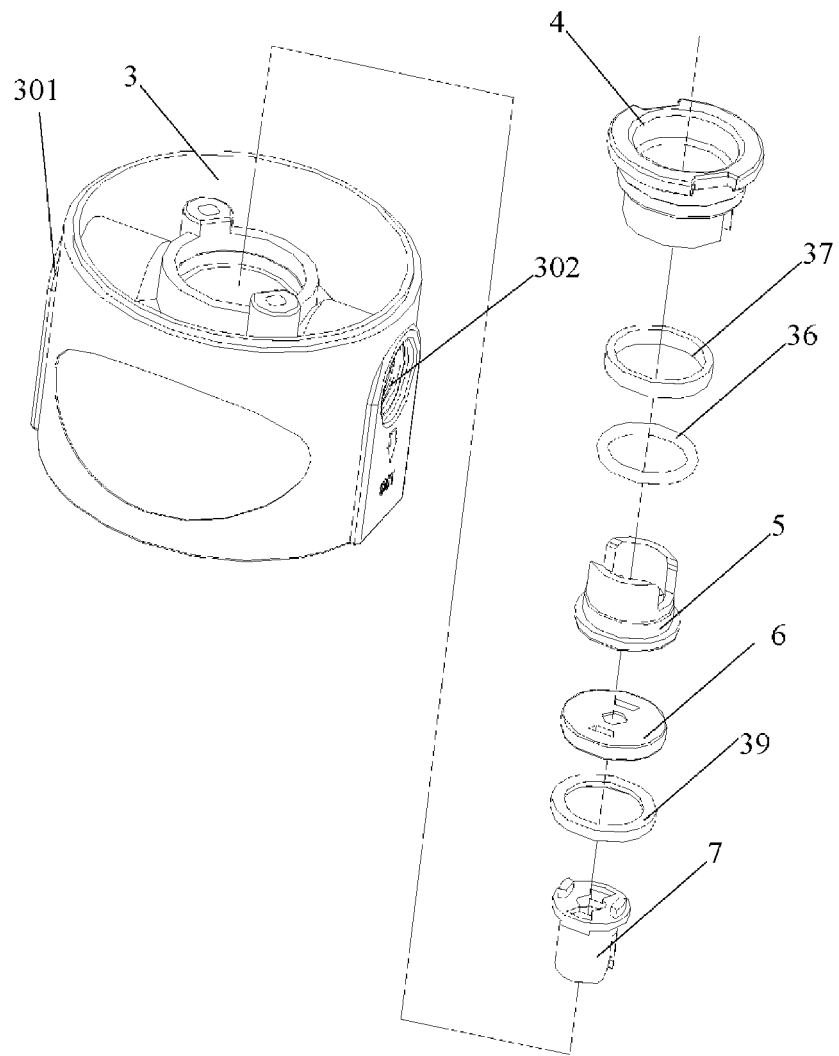
FIG. 2 shows a disassembled view of a filter core cover of the present patent application.

As shown in FIG. 2, the filter core cover 1 includes a holder 3, a nut cap 4, an upper ceramic piece 5, a lower ceramic piece 6 and a rotating shaft 7. The nut cap 4, upper ceramic piece 5, lower ceramic piece 6 and rotating shaft 7 are connected in proper order. The nut cap 4 is mounted inside the holder 3 by ultrasonic welding.

Figure 4A:
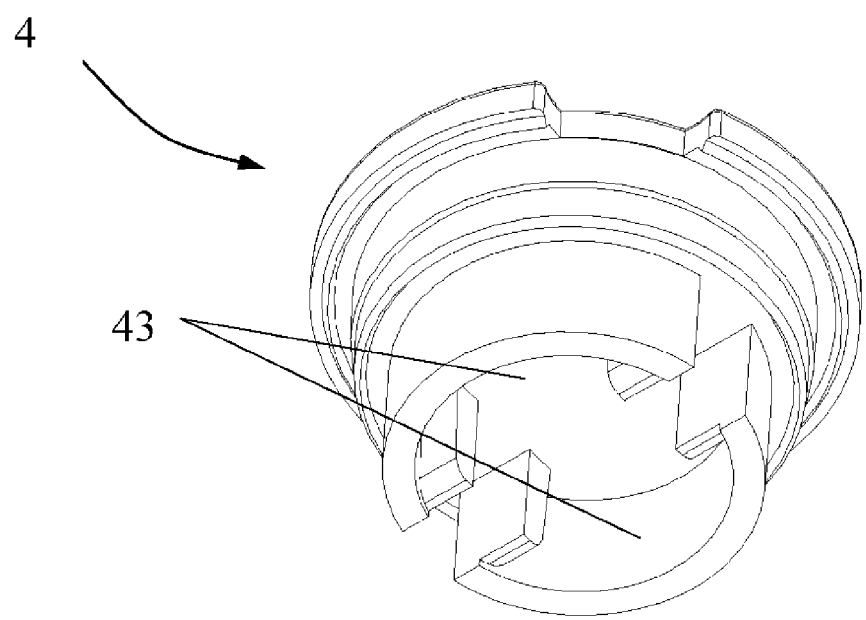
FIG. 4A shows the structure of a nut cap of the present patent application.
Figure 4B:
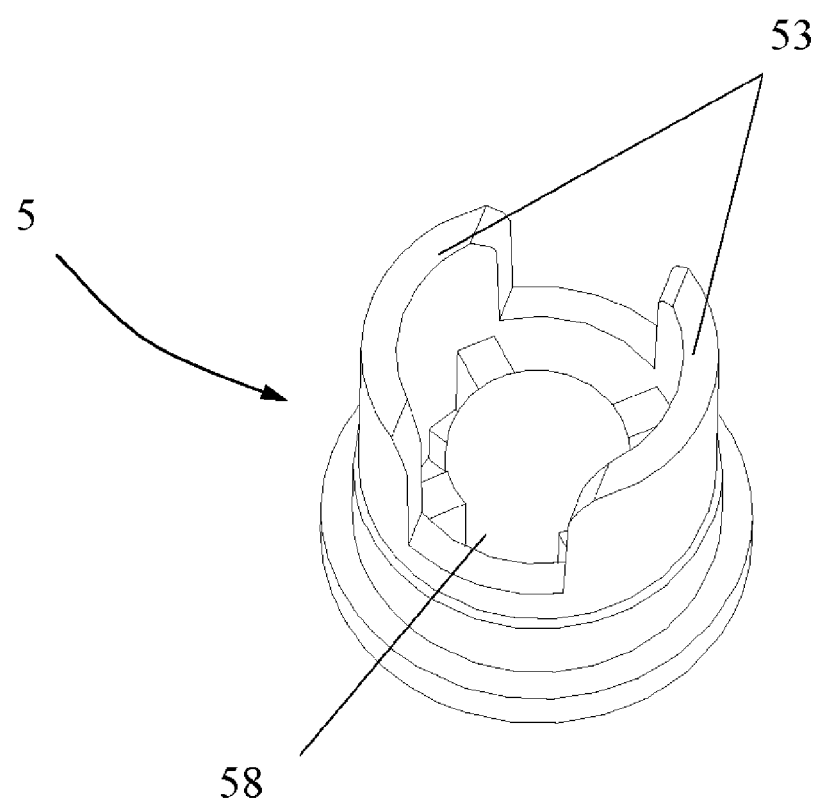
FIG. 4B shows an upper ceramic piece of the present patent application.

As shown in FIGS. 4A and 4B, the nut cap 4 includes a notch 43. The upper ceramic piece 5 includes a projection 53 for cooperating with the notch 43. Namely, the upper ceramic piece 5 can be mounted in the holder 3 indirectly through the nut cap 4. The upper ceramic piece 5 can be fixed in the holder 3 directly or indirectly by other arrangements to ensure that the upper ceramic piece 5 does not rotate or move relative to the holder. The upper ceramic piece 5 also includes an aperture 58 in connection with the water inlet 301.

Figure 5A:
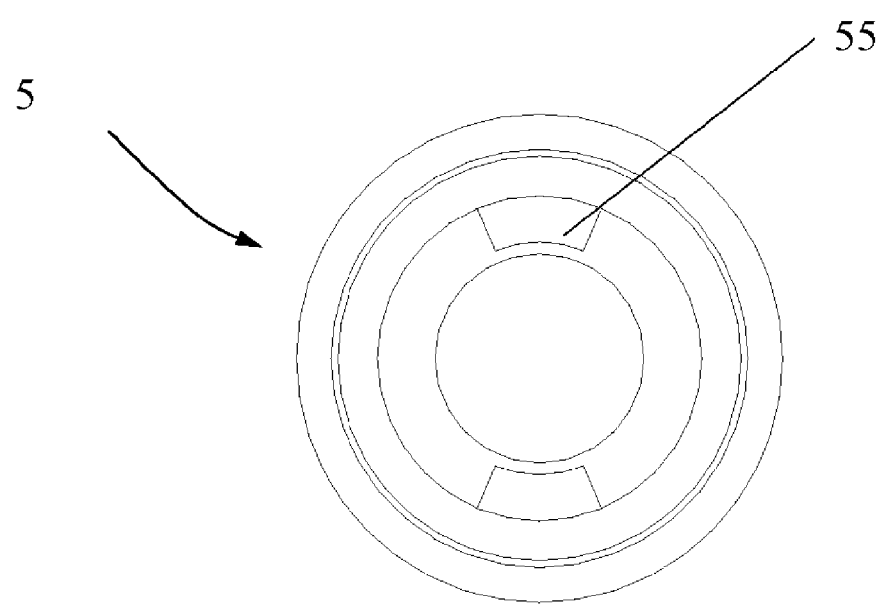
FIG. 5A shows a surface of the upper ceramic piece which is in contact with a lower ceramic piece of the present patent application.
Figure 5B:
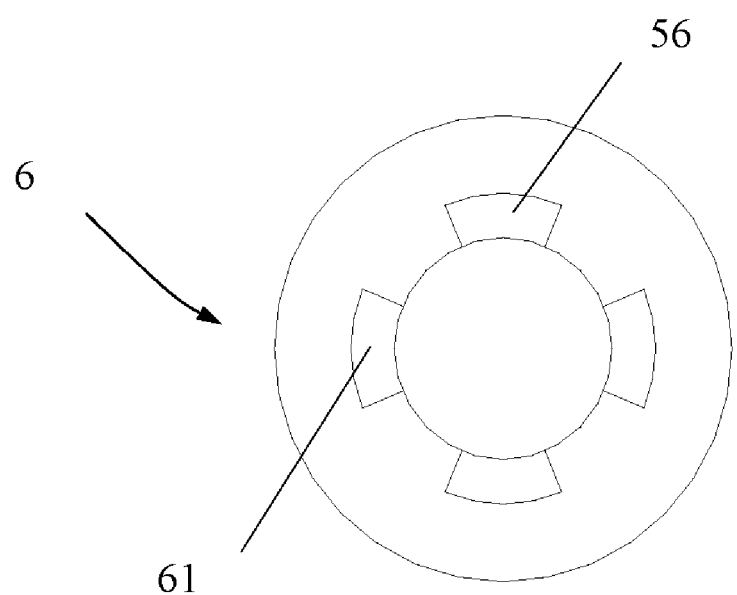
FIG. 5B shows a surface of the lower ceramic piece which is in contact with the upper ceramic piece of the present patent application.
Figure 5C:
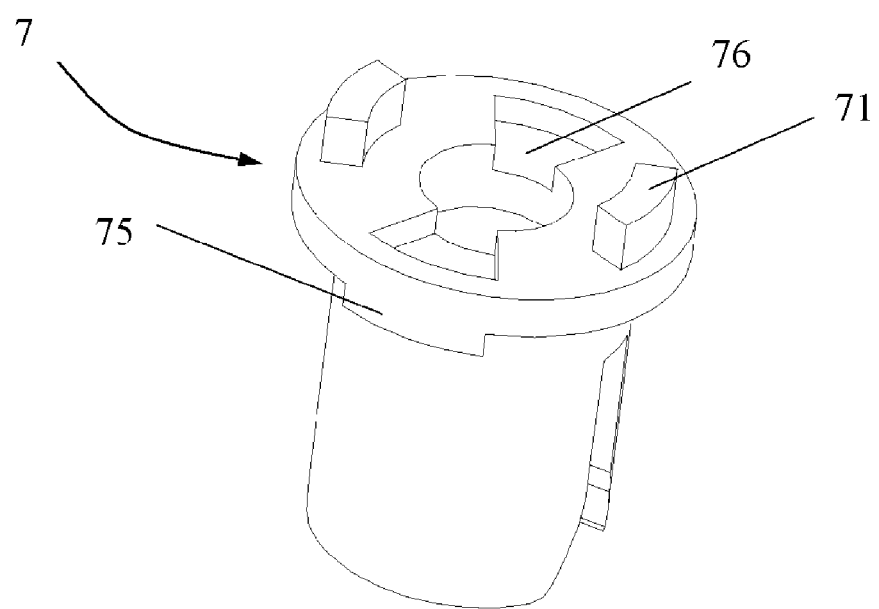
FIG. 5C shows a rotating shaft of the present patent application.
Figure 6A:
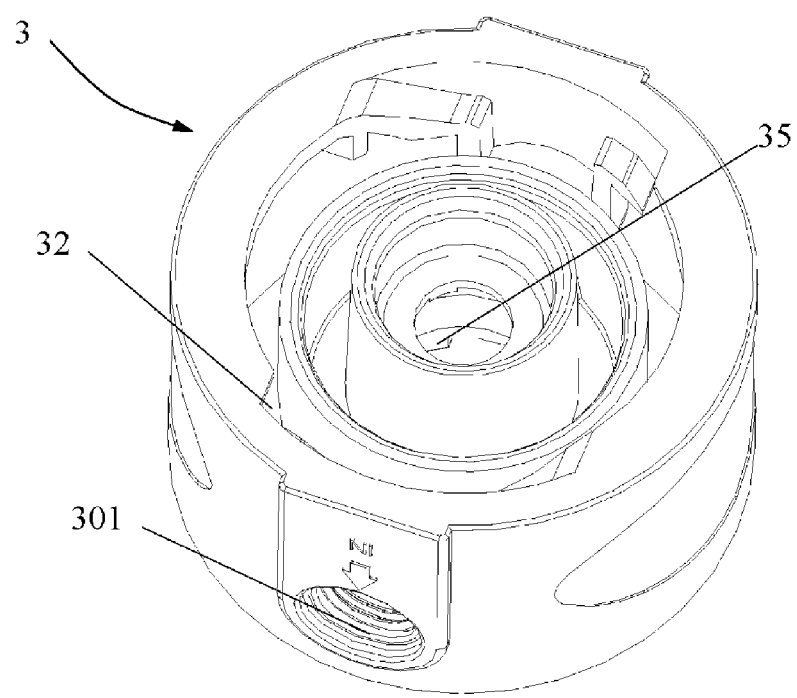
FIG. 6A shows a holder of the present patent application.
Figure 9A:
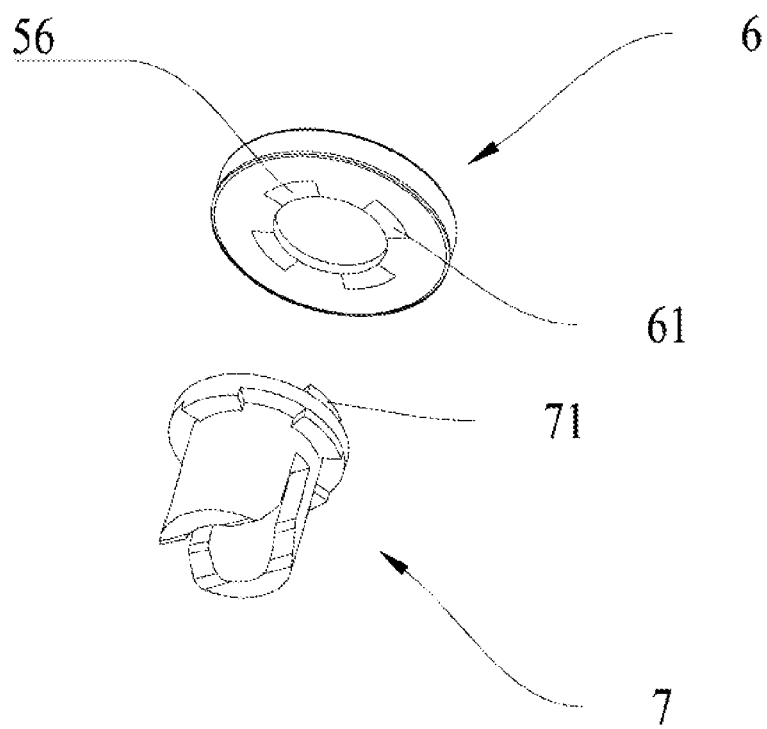
FIG. 9A and FIG. 9B show that the projection of the rotating shaft engages the groove of the lower ceramic piece.
Figure 9B:
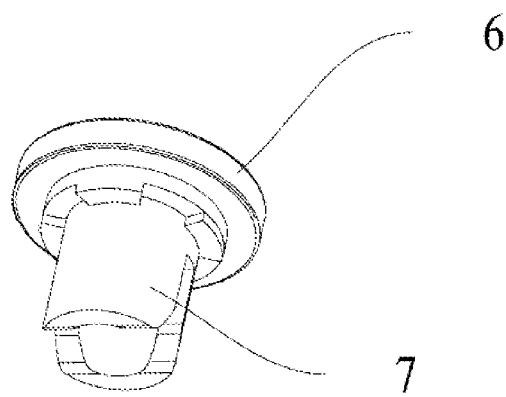

As shown in FIG. 5A, FIG. 5B and FIG. 5C, the contact surface of the upper ceramic piece 5 and lower ceramic piece 6 is smooth. It can achieve a good sealing effect, and prevent a leakage phenomenon. The upper ceramic piece 5 includes a first through hole 55. The lower ceramic piece 6 includes a corresponding second through hole 56 in cooperation with the first through hole 55. The lower ceramic piece 6 includes a first groove 61. As shown in FIG. 9A and FIG. 9B, the rotating shaft 7 includes a projection 71 for cooperation with the first groove 61. The rotating shaft 7 is used to drive the lower ceramic piece 6 to rotate. As shown in FIG. 5C and FIG. 6A, the rotating shaft 7 includes a limiting block 75 which is in cooperation with the limiting groove 35 of the holder 3. The limiting block 75 can restrict the relative rotation angle between the upper ceramic piece 5 and lower ceramic piece 6 to be less than or equal to 90 degrees. The rotating shaft 7 further includes a third through hole 76 in connection with the second through hole 56. The third through hole 76 is used to connect the second through hole 56 and the water division end cap 10.

Figure 3:
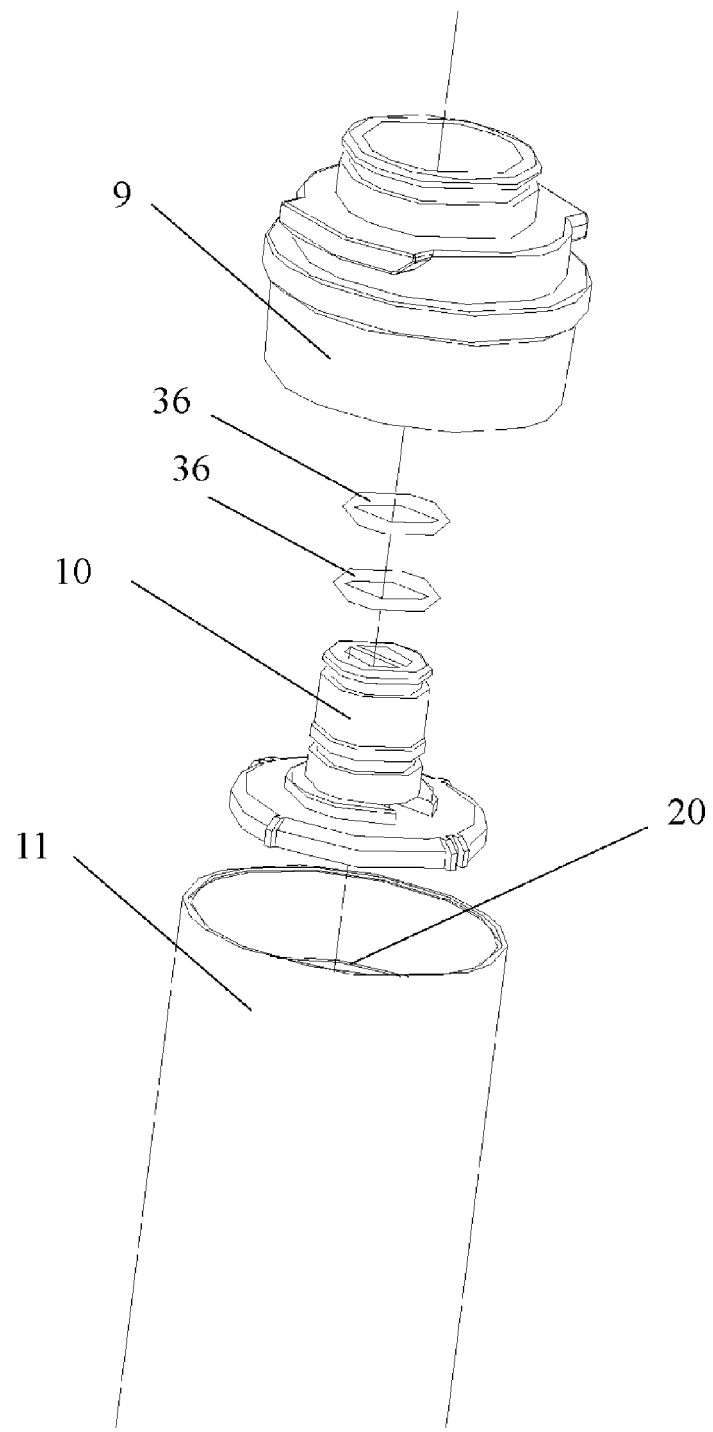
FIG. 3 shows a disassembled view of a filter cartridge of the present patent application.

As shown in FIG. 2 and FIG. 3, an O-type sealing ring is set between the holder 3 and the upper ceramic piece 5 for sealing. A pressure ring 37 is set between the holder 3 and O-type sealing ring to press the O-type sealing ring to achieve a better sealing effect.

A washer 39 is set between the lower ceramic piece 6 and rotating shaft 7. The washer 39 separates the lower ceramic piece 6 and rotating shaft 7 and covers the external edge of the rotating shaft 7. The material of the washer 39 can be polyvinyl fluoride. Since the washer 39 has a smooth surface, it can reduce the friction and reduce wear and tear, save the operation effort.

Figure 6B:
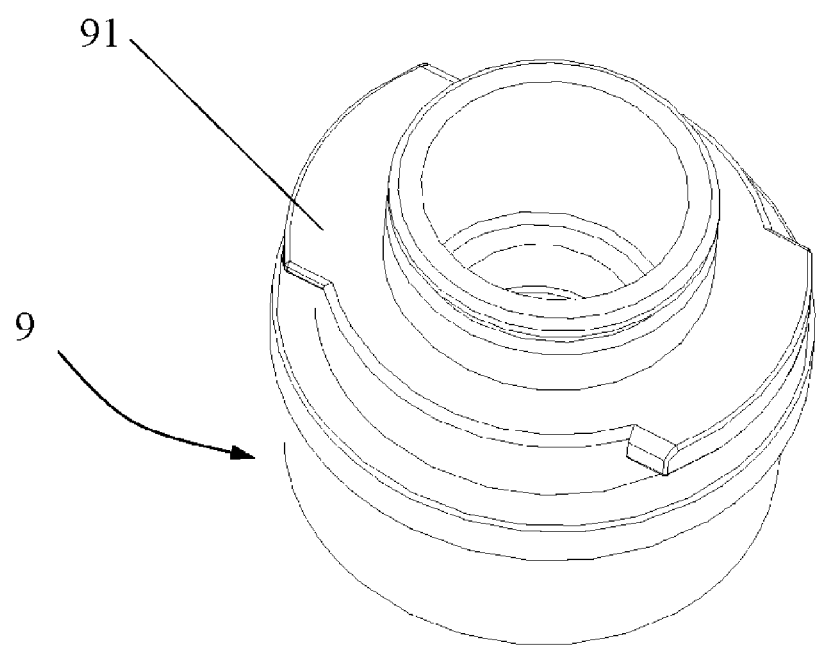
FIG. 6B shows a snap button of the present patent application.

As shown in FIG. 3, the filter cartridge 2 includes a snap button 9, a water division end cap 10 and a barrel 11. The snap button 9 and the water division end cap 10 can be rotated to fasten together. The filter core 20 is mounted inside the barrel 11. The water division end cap 10 is mounted at one end of the filter cartridge 2, and adhesive to the filter core 20. The water division end cap 10 is cooperated with the rotating shaft 7. The snap button 9 and holder 3 snap together by relatively rotating 90 degrees. As shown in FIG. 6A and FIG. 6B, snap button 9 includes a flat open bayonet 91. The holder 3 includes a flat open groove 32 in cooperation with the flat open bayonet 91, and can be used to connect the filter cover 1 and filter cartridge 2.

Figure 7A:
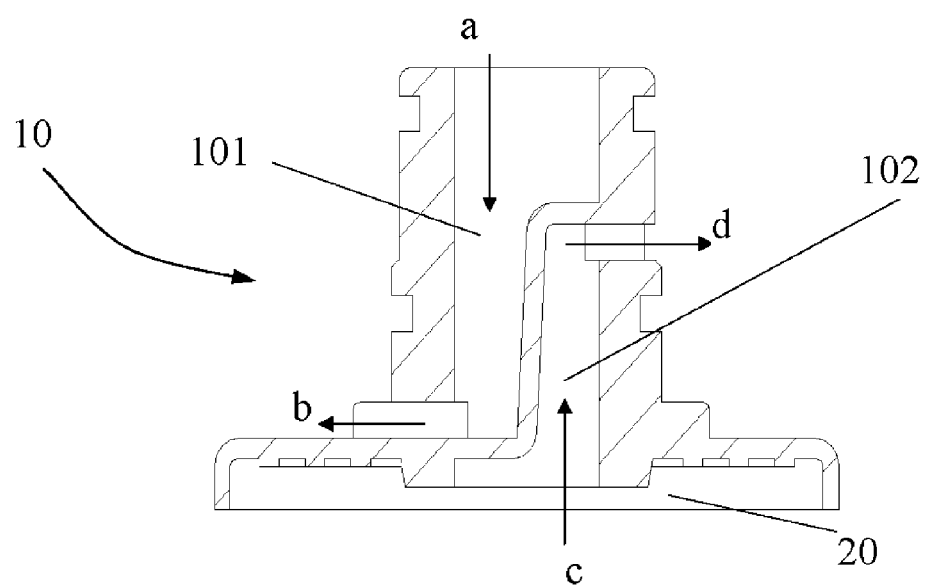
FIG. 7A shows an internal structure of a water division end cap of the present patent application.
Figure 7B:
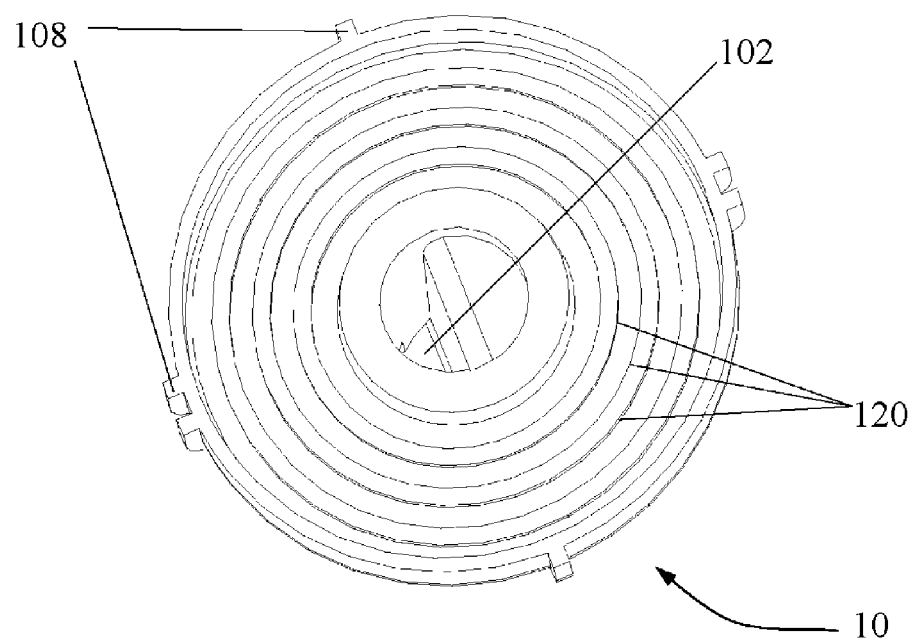
FIG. 7B shows a bottom surface of the water division end cap which is connected to the filter core of the present patent application.

As shown in FIG. 7A, the water division end cap 10 includes a water inlet channel 101 and a water outlet channel 102, corresponding to the water inlet 301 and outlet 302 of the holder 3 (as shown in FIGS. 2 and 6A) respectively. The water inlet channel 101 and the water outlet channel 102 are independent and disconnected. As shown in FIG. 7B, the water division end cap 10 includes a third projection 108. As shown in FIG. 3, a seal ring 36 is set on the top of the water division end cap. The snap button 9 covers the barrel 11 tightly. Relative rotation between the snap button 9 and the barrel does not occur during the rotation.

When the detachable and replaceable water filter assembly is in an inoperative or a closed state, the first through hole 55 and second through hole 56 are disconnected. The water inlet channel 101 and water inlet 301 are disconnected; the water outlet channel 102 and water outlet 302 are disconnected.

When detachable and replaceable water filter assembly is in an operative or an open state, the first through hole 55 and the second through hole are connected. The water inlet channel 101 and water inlet 301 are connected; the water outlet channel 102 and water outlet 302 are connected.

Figure 8A:
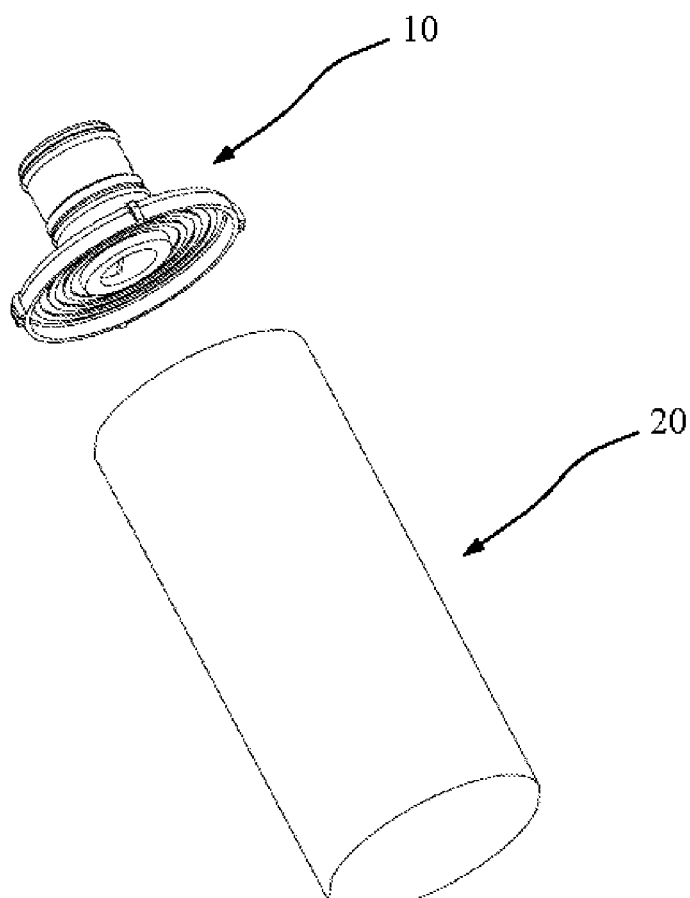
FIG. 8A and FIG. 8B show the contact between the water division end cap and filter core.
Figure 8B:
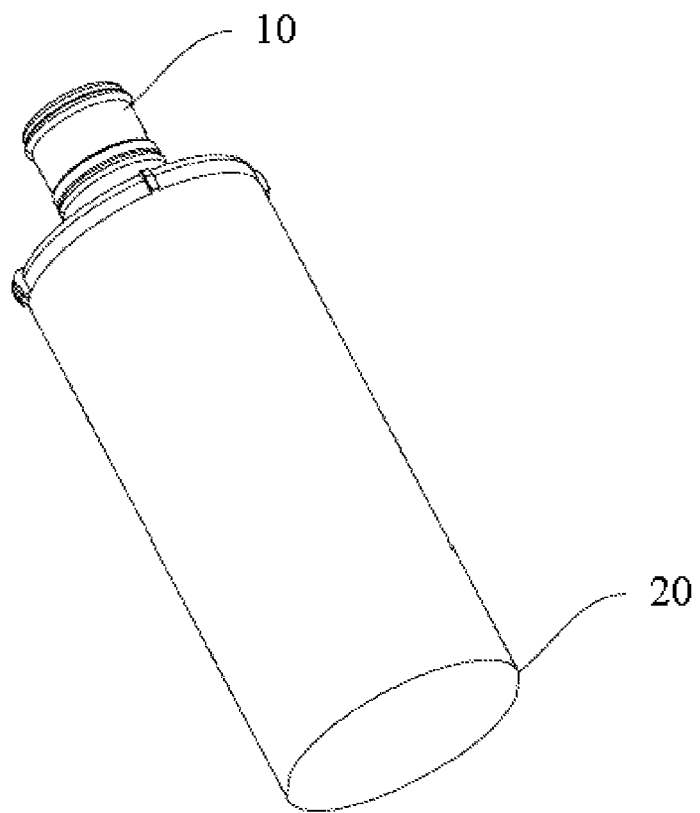

As shown in FIG. 7B, FIG. 8A and FIG. 8B, the water division end cap 10 and filter core contact. The wave form stripes 120 are located on the contacting side of the water division end cap 10 to increase the bonding surface area, and strengthen the soundness between the water division end cap 10 and the filter core 20.

The working principle of the present patent application is as follows:

When the filter cover 1 and filter cartridge 2 are detached, the detachable and replaceable water filter assembly is in an inoperative state.

After installing the filter core 20 in the filter cartridge 2, rotate the filter cover 1 to snap together with the filter cartridge 2. At the same time, the rotating shaft 7 in the filter cover 1 is rotated being driven by the rotation of the filter cartridge 2. The rotating shaft 7 rotates 90 degrees synchronously after the filter cartridge 2 rotating 90 degrees. The lower ceramic piece 6 rotates 90 degrees relative to the upper ceramic piece 5 driven by the rotating shaft. The first through hole 55, the second through hole 56 and the third through hole 76 are connected and in an open state. As shown in FIG. 7A, external water enters into the filter cover 1 through the water inlet 301; and passes through the second through hole 56, the third through hole 76, and the water inlet channel 101 of the water division end cap 10 (indicated by arrow a); and enters into the internal of the filter core 20 from the external of the filter core to filter (indicated by arrow b). Filtered water passes from the internal of the filter core, the water inlet channel 101 of the water division end cap 10 (indicated by arrow c), and the water outlet 302 of the holder 3 to outflow (indicated by arrow d).

If it is needed to repair or replace the filter core, rotate the filter cartridge 2 reversely, the upper ceramic piece 5 rotate 90 degrees relative to the lower ceramic piece 6, the first through hole 55 and the second through hole 56 are disconnected and closed to water flow. At the same time, the filter cartridge 2 can be detached from the filter cover 1 for repair or replacement.

The solutions provided by the present patent application have the following advantages. The structure is very simple without multi-branch pipe components and elastic device. It's easy to be dismantled and assembled. The solutions provided by the present patent application is shockproof and be able to prevent excessive rotation. The water inlet channel and the water outlet channel are independent. This design can prevent secondary pollution.

While the present patent application has been shown and described with particular references to a number of embodiments thereof, it should be noted that various other changes or modifications may be made without departing from the scope of the present patent application.

The invention claimed is:

1. A detachable and replaceable water filter assembly comprising:
    a filter core cover; and
    a filter cartridge;
    wherein the filter core cover and the filter cartridge are fastened together; the filter core cover comprises a holder, a nut cap, an upper ceramic piece, a lower ceramic piece, and a separate rotating shaft; the nut cap, the upper ceramic piece, the lower ceramic piece, and the rotating shaft are connected; the nut cap is mounted inside the holder; the upper ceramic piece comprises a first through hole; the lower ceramic piece comprises a corresponding second through hole; the lower ceramic piece comprises a first groove; the rotating shaft comprises a first projection for cooperation with the first groove and is used to drive the lower ceramic piece to rotate; the first projection inserts into and engages with the first groove, the rotating shaft drives the lower ceramic piece to rotate through an engagement of the first groove and the first projection;
    the rotating shaft comprises two opposite limiting projections at a top surface of the rotating shaft for cooperating with two opposite limiting grooves of the holder for restricting the relative rotation angle between the upper ceramic piece and the lower ceramic piece to be less than or equal to 90 degrees;
    the filter cartridge comprises a snap button, a water division end cap and a barrel; the snap button and the water division end cap are rotated to fasten together; the barrel has a filter core; the water division end cap is mounted at one end of the filter cartridge, and bonded to the filter core; the water division end cap is cooperated with the rotating shaft; the snap button covers the barrel;
    the water division end cap includes a water inlet channel and a water outlet channel for cooperating with a water inlet and a water outlet of the holder respectively; the water inlet channel and the water outlet channel are independent and disconnected;
    the upper ceramic piece comprises an aperture in connection with the water outlet;
    the rotating shaft further comprises a third through hole for cooperation with the second through hole; the third through hole is used to connect the second through hole and the water division end cap;
    wherein the nut cap comprises a notch, and the upper ceramic piece comprises a projection for cooperating with the notch which is fixed in the holder; and only the notch and the projection form as a connection between the nut cap and upper ceramic piece;
    wherein, when the water filter assembly is in an inoperative state, the water inlet channel is disconnected with the water inlet, the water outlet channel is disconnected with the water outlet, and the first through hole is disconnected with the second through hole; and
    wherein, when the water filter assembly is in an operative state, the water inlet channel is connected with the water inlet; the water outlet channel is connected with the water outlet, and the first through hole is connected with the second through hole;
    wherein after installing the filter core in the filter cartridge, the filter core cover is rotated to snap together with the filter cartridge; the rotating shaft in the filter core cover is rotated being driven by the rotation of the filter cartridge; the rotating shaft rotates 90 degrees synchronously after the filter cartridge rotates 90 degrees; the lower ceramic piece rotates 90 degrees relative to the upper ceramic piece driven by the rotating shaft; the first through hole, the second through hole and the third through hole are connected and in an open state; external water enters into the filter core cover through the water inlet; and passes through the second through hole, the third through hole, and the water inlet channel of the water division end cap; and enters into the internal of the filter core from the external of the filter core to filter; filtered water passes from the filter core, the water inlet channel of the water division end cap, and the water outlet of the holder to outflow; and
    wherein when the filter cartridge is rotated reversely, the upper ceramic piece rotates 90 degrees relative to the lower ceramic piece, the first through hole and the second through hole are disconnected and closed to water flow; the filter cartridge is detached from the filter core cover for repair or replacement.

2. The detachable and replaceable water filter assembly of claim 1, wherein the snap button comprises a flat open bayonet, and the holder comprises a flat open groove in cooperation with the flat open bayonet.

3. The detachable and replaceable water filter assembly of claim 2, wherein the snap button and the holder snap together by rotating 90 degrees.

4. The detachable and replaceable water filter assembly of claim 1, wherein the water division end cap has wave form stripes on the side thereof being in contact with the filter core.

5. The detachable and replaceable water filter assembly of claim 1, wherein two O-type sealing rings are set on the top of the water division end cap and set between the holder and the upper ceramic piece respectively.

6. The detachable and replaceable water filter assembly of claim 5, further comprising a pressure ring being set between the nut cap and the two O-type sealing rings.

7. The detachable and replaceable water filter assembly of claim 1, further comprising a washer being set between the lower ceramic piece and rotating shaft.

8. A detachable and replaceable water filter assembly consisting of:
- a filter core cover; and
- a filter cartridge;
- wherein the filter core cover and the filter cartridge are fastened together; the filter core cover consists of a holder, a nut cap, an upper ceramic piece, a lower ceramic piece, and a separate rotating shaft; the nut cap, the upper ceramic piece, the lower ceramic piece, and the rotating shaft are connected; the nut cap is mounted inside the holder; the upper ceramic piece comprises a first through hole; the lower ceramic piece comprises a corresponding second through hole; the lower ceramic piece comprises a first groove; the rotating shaft comprises a first projection for cooperation with the first groove and is used to drive the lower ceramic piece to rotate; the first projection inserts into and engages with the first groove, the rotating shaft drives the lower ceramic piece to rotate through an engagement of the first groove and the first projection;
- the rotating shaft comprises two limiting projections at a top surface of the rotating for cooperating with two limiting grooves of the holder for restricting the relative rotation angle between the upper ceramic piece and the lower ceramic piece to be less than or equal to 90 degrees;
- the filter cartridge comprises a snap button, a water division end cap and a barrel; the snap button and the water division end cap are rotated to fasten together; the barrel has a filter core; the water division end cap is mounted at one end of the filter cartridge, and bonded to the filter core; the water division end cap is cooperated with the rotating shaft; the snap button covers the barrel;
- the water division end cap includes a water inlet channel and a water outlet channel for cooperating with a water inlet and a water outlet of the holder respectively; the water inlet channel and the water outlet channel are independent and disconnected;
- the upper ceramic piece comprises an aperture in connection with the water outlet;
- the rotating shaft further comprises a third through hole for cooperation with the second through hole; the third through hole is used to connect the second through hole and the water division end cap;
- wherein the nut cap comprises a notch, and the upper ceramic piece comprises a projection for cooperating with the notch which is fixed in the holder; and only the notch and the projection form as a connection between the nut cap and upper ceramic piece;
- wherein when the water filter assembly is in an inoperative state, the water inlet channel is disconnected with the water inlet, the water outlet channel is disconnected with the water outlet, and the first through hole is disconnected with the second through hole; and
- wherein when the water filter assembly is in an operative state, the water inlet channel is connected with the water inlet; the water outlet channel is connected with the water outlet, and the first through hole is connected with the second through hole;
- wherein after installing the filter core in the filter cartridge, the filter core cover is rotated to snap together with the filter cartridge; the rotating shaft in the filter core cover is rotated being driven by the rotation of the filter cartridge; the rotating shaft rotates 90 degrees synchronously after the filter cartridge rotates 90 degrees; the lower ceramic piece rotates 90 degrees relative to the upper ceramic piece driven by the rotating shaft; the first through hole, the second through hole and the third through hole are connected and in an open state; external water enters into the filter core cover through the water inlet; and passes through the second through hole, the third through hole, and the water inlet channel of the water division end cap; and enters into the internal of the filter core from the external of the filter core to filter; filtered water passes from the filter core, the water inlet channel of the water division end cap, and the water outlet of the holder to outflow; and
- wherein when the filter cartridge is rotated reversely, the upper ceramic piece rotates 90 degrees relative to the lower ceramic piece, the first through hole and the second through hole are disconnected and closed to water flow; the filter cartridge is detached from the filter core cover for repair or replacement.

* * * * *